United States Patent
Sun et al.

(10) Patent No.: US 12,224,587 B2
(45) Date of Patent: Feb. 11, 2025

(54) EXTRACTION OF INSTANTANEOUS RENEWABLE GENERATION FROM NET LOAD MEASUREMENTS OF POWER DISTRIBUTION SYSTEMS

(71) Applicant: Mitsubishi Electric Research Laboratories, Inc., Cambridge, MA (US)

(72) Inventors: Hongbo Sun, Lexington, MA (US); Ashwin Shirsat, Raleigh, NC (US); Kyeong Jin Kim, Lexington, MA (US); Jianlin Guo, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 503 days.

(21) Appl. No.: 17/656,465

(22) Filed: Mar. 25, 2022

(65) Prior Publication Data
US 2023/0307908 A1    Sep. 28, 2023

(51) Int. Cl.
*G06N 3/049* (2023.01)
*G06N 3/045* (2023.01)
(Continued)

(52) U.S. Cl.
CPC .............. *H02J 3/004* (2020.01); *G06N 3/045* (2023.01); *G06N 3/049* (2013.01); *G06Q 50/06* (2013.01);
(Continued)

(58) Field of Classification Search
CPC .. H02J 3/004; H02J 3/003; H02J 3/381; H02J 2300/24; H02J 2203/20; G06N 3/045; G06N 3/049; G06Q 50/06
See application file for complete search history.

(56) References Cited

U.S. PATENT DOCUMENTS 9,172,623 B1 * 10/2015 Micali ..................... H04L 67/12
10,983,496 B1 * 4/2021 Aljohani ............ G05B 19/0428
(Continued)

*Primary Examiner* — Gary Collins
(74) *Attorney, Agent, or Firm* — Gene Vinokur

(57) ABSTRACT

A computer-implemented method is provided for performing energy disaggregation of a distribution system-level net-load measurements using continuous-point-on-wave (CPOW) measurement units. The method uses a processor coupled with a memory stored instructions implementing the method using neural networks including an encoder network, a feature extractor, a separator network, a decoder network stored in the memory, wherein the instructions, when executed by the processor carry out at steps of the method include generating net-load time series data from voltage and current measurements via the CPOW measurement units, generating a compressed latent space representation from the net-load time series, converting the net-load time series into time-frequency domain, passing time domain cotextual information with the converted time-frequency domain representation of net-load time series to the feature extractor, estimating two weight matrices to be multiplied with an output from the encoder network and learning temporal features of a native load and a photovoltaic (PV) generation, transforming weighted latent representation corresponding the native load and the PV generation into time-domain representations, and predicting the native load and the PV generation at distribution system-level from the transformed time domain representations corresponding to the native load and PV generations.

24 Claims, 17 Drawing Sheets

(51) Int. Cl.
*G06Q 50/06* (2012.01)
*H02J 3/00* (2006.01)
*H02J 3/38* (2006.01)

(52) U.S. Cl.
CPC .............. *H02J 3/003* (2020.01); *H02J 3/381* (2013.01); *H02J 2203/20* (2020.01); *H02J 2300/24* (2020.01)

(56) References Cited

U.S. PATENT DOCUMENTS

| | | | |
|---|---|---|---|
| 2014/0207298 A1* | 7/2014 | Gupta | G05B 15/02 700/291 |
| 2019/0013669 A1* | 1/2019 | Davies | G01D 4/004 |

* cited by examiner

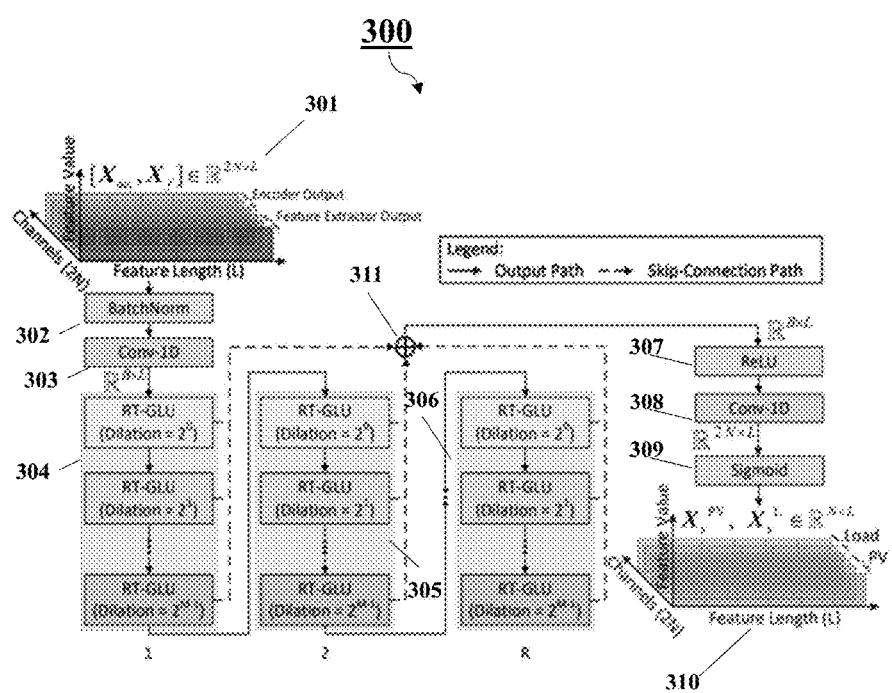
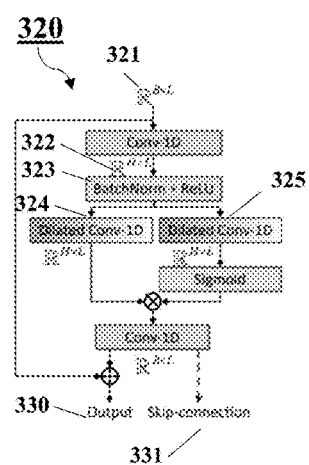
FIG. 3A
FIG. 3B

Algorithm 1 Conv-EDNet+ training algorithm

Input: Training data $(p^{NL}, f^{Irr/Temp}, F^{STFT-V/I}, \vec{p}^{\perp}, \vec{p}^{PV})$, total epoch count $E$, threshold epoch $\tilde{E}$, total number of samples $B$, mini-batch size $b, \lambda = 0$.

Output: $\Theta^*_{ae_1}, \Theta^*_f, \Theta^*_s, \Theta^*_{ae_2}, \Theta^*_d$ 1: for epoch $e \in [1, E]$ do
2:   for mini-batch $k \in [1, B/b]$ do
3:     $X_{ae_1} \leftarrow f_{ae_1}(p^{NL}, \Theta_{ae_1})$
4:     $X_f, \leftarrow f_f(f^{Irr/Temp}, F^{STFT-V/I}, \Theta_f)$
5:     $X_s^{PV}, X_s^{\perp} \leftarrow f_s(X_{ae_1}, X_f, \Theta_s)$
6:     $p_s^{\perp}, p_s^{PV} \leftarrow f_{ae_2}(X_{ae_1} \otimes X_s^{PV}, X_{ae_1} \otimes X_s^{\perp}, \Theta_{ae_2})$
7:     $\zeta^{Gen.} \leftarrow f_d(p^{\perp} - p^{\perp}_s, \Theta_d)$
8:     Compute generator $\mathcal{G}$ loss $\mathcal{L}^{MSE}$ using (5)
9:     Compute discriminator $\mathcal{D}$ loss $\mathcal{L}^{BCE}_{\gamma=1}$ using $\zeta^{Gen.}$ and (6)
10:     $\mathcal{L}^{\mathcal{G}} = \mathcal{L}^{MSE} + \lambda \mathcal{L}^{BCE}_{\gamma=1}$
11:     $\Theta_{ae_1}, \Theta_f, \Theta_s, \Theta_{ae_2} = \text{Adam}(\nabla_\Theta \mathcal{L}^{\mathcal{G}}, \Theta_{ae_1}, \Theta_f, \Theta_s, \Theta_{ae_2})$
12:     if $e \geq \tilde{E}$ then
13:       $\lambda = 1$
14:       $\zeta^{Real} \leftarrow f_d(p^{NL}, \Theta_d)$
15:       $\zeta^{Gen.} \leftarrow f_d(p^{\perp} - p^{\perp}_s, \Theta_d)$
16:       Compute discriminator $\mathcal{D}$ loss $\mathcal{L}^{BCE}_{\gamma=1}$ using $\zeta^{Real}$ and (6)
17:       Compute discriminator $\mathcal{D}$ loss $\mathcal{L}^{BCE}_{\gamma=0}$ using $\zeta^{Gen.}$ and (6)
18:       $\mathcal{L}^{\mathcal{D}} = (\mathcal{L}^{BCE}_{\gamma=1} + \mathcal{L}^{BCE}_{\gamma=0})/2$
19:       $\Theta_d = \text{Adam}(\nabla_\Theta \mathcal{L}^{\mathcal{D}}, \Theta_d)$
20:     end if
21:   end for
22: end for
23: return $(\Theta^*_{ae_1}, \Theta^*_f, \Theta^*_s, \Theta^*_{ae_2}, \Theta^*_d)$

FIG. 5A

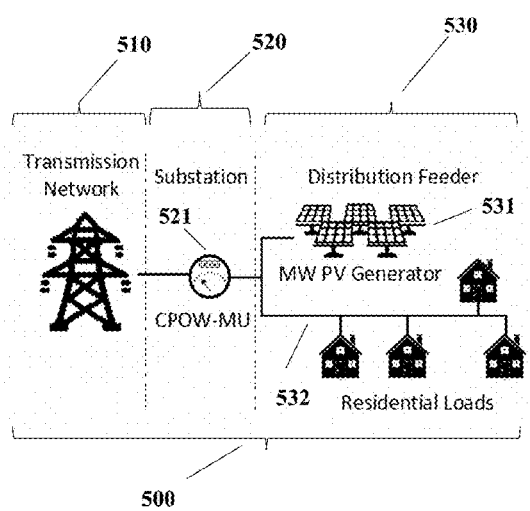

FIG. 5B

| Hyperparameters | | |
|---|---|---|
| Param. | Description | Value |
| $b$ | Mini-batch size in $ae_1$, $ae_2$, $s$, $f$, $d$. | 32 |
| $B$ | Number of bottleneck channels in M. | 64 |
| $E$ | Total training epochs. | 200 |
| $\hat{E}$ | Epochs for which $\mathcal{G}$ is independently trained. | 75 |
| $F$ | STFT frequency components (spectrogram height). | 75 |
| $H$ | Number of channels in RT-GLU block. | 256 |
| $K$ | Kernel size* in $ae_1$, $ae_2$, $f$, $s$, $d$. | 2 |
| $L$ | Length* of each channel in $ae_1$, $ae_2$, $f$, $s$, $d$. | 199 |
| $M$ | Number of RT-GLU blocks in sequence. | 4 |
| $N$ | Number of channels in $ae_1$, $ae_2$, $f$, $s$, $d$. | 512 |
| $Q$ | Number of features in GRU hidden state in $d$. | 64 |
| $R$ | Number of sequential repeats of RT-GLU blocks. | 6 |
| $S$ | Convolution stride* in $ae_1$, $ae_2$, $f$, $s$, $d$. | 1 |
| $T$ | Data segment length* in $ae_1$, $ae_2$, $s$, $d$. | 200 |
| $T$ | Data segment length* in $f$. | 3000 |
| $T$ | STFT spectrogram width*. | 200 |

*Size in samples.

FIG. 5C

COMPARISON OF PERFORMANCE METRICS.

| Method | Performance metrics (MW) | | | | | |
|---|---|---|---|---|---|---|
| | Load | | | PV | | |
| | MAE | RMSE | SAE | MAE | RMSE | SAE |
| Conv-EDNet | 0.115 | 0.121 | 0.127 | 0.083 | 0.086 | 4.604 |
| Conv-EDNet+ | 0.108 | 0.112 | 0.124 | 0.055 | 0.059 | 1.505 |
| Conv-TasNet | 0.339 | 0.352 | 0.391 | 0.272 | 0.274 | 10.86 |
| DAE-Net | 0.205 | 0.373 | 0.195 | 0.532 | 0.544 | 16.45 |

FIG. 7

Algorithm 2 ConvED-DAN training algorithm

Input: Source domain training data $(p^{NL}, f^{Irr/Temp}, F^{STFT-V/I}, \overline{p}_i^L, \overline{p}_i^{PV})$ with $\hat{T}$ samples, target domain training data $(p^{NL}, f^{Irr/Temp}, F^{STFT-V/I})$ with $\hat{T}$ samples total epoch count $E$, threshold epoch $\hat{E}$, total number of samples $B$, mini-batch size $b$.

Output: The network component $(\Theta_{ae_1}^*, \Theta_f^*, \Theta_s^*, \Theta_{ae_2}^*, \Theta_d^*)$

*Initialization*: $\delta = 0$.

1. for epoch $e \in [1, E]$ do
2.   for mini-batch $k \in [1, B/b]$ do
3.     *# Train generator (G)*
4.       *# Source domain data*
5.       $X_{ae_1} \leftarrow f_{ae_1}(p^{NL}, \Theta_{ae_1})$
6.       $X_f \leftarrow f_f(f^{Irr/Temp}, F^{STFT-V/I}, \Theta_f)$
7.       $X_s^{PV}, X_s^L \leftarrow f_s(X_{ae_1}, X_f, \Theta_s)$
8.       $p^L, p^{PV} \leftarrow f_{ae_2}(X_{ae_1} \otimes X_s^{PV}, X_{ae_1} \otimes X_s^L \otimes \Theta_{ae_2})$
9.       $\zeta^{Source} \leftarrow f_d(f^{Source}, \Theta_d)$
10.     Compute source domain generator $G$ loss $\mathcal{L}^{MSE,Source}$ using (11)
11.       *# Target domain data*
12.     $X_{ae_1} \leftarrow f_{ae_1}(p^{NL}, \Theta_{ae_1})$
13.     $X_f \leftarrow f_f(f^{Irr/Temp}, F^{STFT-V/I}, \Theta_f)$
14.     $X_s^{PV}, X_s^L \leftarrow f_s(X_{ae_1}, X_f, \Theta_s)$
15.     $p^L, p^{PV} \leftarrow f_{ae_2}(X_{ae_1} \otimes X_s^{PV}, X_{ae_1} \otimes X_s^L \otimes \Theta_{ae_2})$
16.     $\zeta^{Target} \leftarrow f_d(f^{Target}, \Theta_d)$
17.     Compute source-target domain data feature space loss $\mathcal{L}^{MSE,Feature}$ using (12)
18.     Compute $\mathcal{L}^{MSE}$ using (13)
19.     *# Back propagation*
20.     $\Theta_{ae_1}, \Theta_f, \Theta_s, \Theta_{ae_2} = \text{Adam}(\nabla_\Theta \mathcal{L}^{MSE}, \Theta_{ae_1}, \Theta_f, \Theta_s, \Theta_{ae_2})$
21.     *# Train discriminator (D)*
22.     if $e \geq \hat{E}$ then
23.       $\delta = 1$
24.       Compute discriminator $D$ loss $\mathcal{L}_{Y=1}^{BCE}$ using $\zeta^{Source}$ and (14)
25.       Compute discriminator $D$ loss $\mathcal{L}_{Y=0}^{BCE}$ using $\zeta^{Target}$ and (14)
26.       $\mathcal{L}^D = (\mathcal{L}_{Y=1}^{BCE} + \mathcal{L}_{Y=0}^{BCE})/2$
27.       *# Back propagation*
28.       $\Theta_d = \text{Adam}(\nabla_\Theta \mathcal{L}^D, \Theta_d)$
29.     end if
30.   end for
31. end for
32. return $(\Theta_{ae_1}^*, \Theta_f^*, \Theta_s^*, \Theta_{ae_2}^*, \Theta_d^*)$

FIG. 9

Domain adaptation results for load disaggregation

| Data for Trained Model | Source Domain Data | | | Target Domain Data | | |
|---|---|---|---|---|---|---|
| | RMSE | SAE | MAE | RMSE | SAE | MAE |
| Source | 0.121 | 0.127 | 0.115 | 0.248 | 0.221 | 0.244 |
| Source → Target | 0.259 | 0.364 | 0.287 | 0.284 | 0.342 | 0.262 |

FIG. 11A

Domain adaptation results for PV disaggregation.

| Data for Trained Model | Source Domain Data | | | Target Domain Data | | |
|---|---|---|---|---|---|---|
| | RMSE | SAE | MAE | RMSE | SAE | MAE |
| Source | 0.086 | 4.604 | 0.083 | 0.268 | 11.86 | 0.265 |
| Source → Target | 0.159 | 6.325 | 0.132 | 0.115 | 9.182 | 0.186 |

FIG. 11B

EXTRACTION OF INSTANTANEOUS RENEWABLE GENERATION FROM NET LOAD MEASUREMENTS OF POWER DISTRIBUTION SYSTEMS

TECHNICAL FIELD

The present disclosure relates generally to electric power systems, and more particularly to estimation of instantaneous renewable generation for power distribution system.

BACKGROUND

Distribution networks and their role in power delivery are undergoing a paradigm shift with the increased penetration of distributed energy resources (DER). To smoothly operate such a complex system with bidirectional power flow, knowing the instantaneous generation and demand is critical. There are many different types of DERs existing, such as photovoltaic (solar) generation, and wind generation. This disclosure focuses on photovoltaic (PV) generations which produce electrical powers using solar energy.

Utilities measure the net system load and are unaware of the native system load and the photovoltaic (PV) generation. Thus, energy disaggregation (ED) plays a pivotal role in increasing grid observability to support network planning and operational tasks. The low-resolution measurements obtained from advanced metering infrastructure (AMI) and the substation supervisory control and data acquisition systems (SCADAs) do not provide the much-needed observability into the DER-rich network. Hence, the utilities are now installing continuous-point-on-wave (CPOW) measurement units to obtain measurements sampled at 1 kHz or higher. It is expected the disaggregation accuracy increases with an increase in the sampling rate, with the best accuracy obtained for data sampling rates ranging, for example between 1 kHz and 12 kHz. Thus, to support ED using CPOW data, novel computationally efficient and accurate algorithms are required.

The methodologies proposed in the existing literature on net-load disaggregation can be classified into two broad categories: model-based and model-free (data-driven). The idea of model-based approaches is to develop a parametric model of PV generation and native demand and statistically estimate the parameters using the available net-load and meteorological data. One example of this kind of work can be found at a paper written by F. Kabir et al., "Estimation of behind-the-meter solar generation by integrating physical with statistical models" published in the proceedings of 2019 IEEE Int. Conf. on Communications, Control, and Computing Technologies for Smart Grids, 2019, pp. 1-6. The disaggregation performance of these approaches is highly dependent on the quality of the parametric model. On the contrary, model-free approaches do not require the parametric model but are affected by the data quality. Some of the model-free techniques for ED use a dictionary learning approach such as the work presented at W. Li et al.'s paper, "real-time energy disaggregation at substations with behind-the-meter solar generation" (IEEE Trans. Power Syst., vol. 36, no. 3, pp. 2023-2034, 2021), or use supervised machine learning techniques as the one proposed in a paper written by R. Saeedi et al., "an adaptive machine learning framework for behind-the-meter load/PV disaggregation (IEEE Trans. Ind. Informat., vol. 17, no. 10, pp. 7060-7069, 2021).

Of all the approaches listed above, the use of CPOW data has not been considered. A source of inspiration for disaggregation using CPOW data can be found in single-channel blind audio source separation. The audio source separation task is similar to ED using CPOW data since the audio signals with frequencies greater than 1 kHz are used. Y. Luo et al have proposed approaches for time-domain audio source separation using deep learning methods in their paper titled as "Conv-TasNet: surpassing ideal time-frequency magnitude masking for speech separation (IEEE/ACM Trans. Audio, Speech, Language Process., vol. 27, no. 8, pp. 1256-1266, 2019).

Summarizing the review of prior arts, we observe that the use of CPOW data has not been considered within all the existing ED approaches. Further, the ED algorithms have not considered the operational status of the PV generators, which could result in disaggregation errors. The methods for audio source separation tasks are designed to handle high granular data. However, they cannot be applied directly to ED due to the difference in the physical properties of sound waves and electric signals.

Therefore, there is a need for advanced energy disaggregation approaches to extract instantaneous renewable generation from net-load measurements for power distribution system by using high fidelity CPOW data.

SUMMARY

The present disclosure presents a set of energy disaggregation methods for separating the distribution system-level net-load measurements into native load and photovoltaic (PV) generation.

A causal, context-aware, and fully-convolutional deep-learning network, called Conv-EDNet is presented for simultaneous PV-load energy disaggregation using continuous point-on-wave measurements. The presented network uses an encoder-decoder framework combined with a separator network for performing disaggregation in the time domain. The separator network, conditioned on time domain and time-frequency domain features, harnesses the power of stacked dilated temporal convolutions for learning two weighting functions that perform the disaggregation using the non-negative encoder output. The decoder converts the weighted encoder output into time-domain native-load and PV generation measurements. The developed model, Conv-EDNet has been further extended into a new model, Conv-EDNet+ by adding adversarial learning feature through a gated recurrent unit (GRU) based discriminator. The addition of adversarial training component to Conv-EDNet, further enhances the model prediction accuracy and robustness.

Compared with existing methods, the proposed deep learning-based model-free time domain netload disaggregation framework is conditioned on time-frequency domain features using CPOW measurements. This framework supports scale and context aware disaggregation, wherein the time domain, time frequency-domain, and spatio-temporal information are used to quantify the scale and context of disaggregation. It also uses a scheme for simultaneous disaggregation of the native load and PV components that eliminates the need for the building and training of two separate networks. For the first time, the use of CPOW measurements along with novel deep learning-based models for distribution system-level ED has been proposed.

Furthermore, Conv-EDNet+ is extended into another new model, ConvED-DAN by combining the convolutional energy disaggregation network with domain adaptation. In ConvED-DAN, the discriminator is repurposed to perform the task of unsupervised domain adaptation. We combine adversarial learning and joint adaptation concepts and modify the Conv-EDNet+ to perform the task of distribution gap minimization of the feature space and label space between the source domain and target domain. This approach enables training the model on synthetically obtained data and its application to real-world measurement data. By using limited labeled data in the source domain and unlabeled target domain data, the proposed network can generate satisfactory results for energy disaggregation using CPOW measurements.

According to some embodiments of the present invention, a computer-implemented method is provided for performing energy disaggregation of a distribution system-level net-load measurements on a distribution system using continuous-point-on-wave (CPOW) measurement units, wherein the method uses a processor coupled with memory stored instructions implementing the method using neural networks including an encoder network, a feature extractor, a separator network, a decoder network stored in the memory, wherein the instructions, when executed by the processor carry out steps of the method, including: generating net-load time-series data from voltage and current measurements via the CPOW measurement units; generating, using the encoder network, a compressed latent space representation from the net-load time series; converting the net-load time series into the time-frequency domain using a short-time Fourier transform (STFT) method; passing time-domain cotextual information with the converted time-frequency domain representation of net-load time series to the feature extractor trained to accurately extract harmonic features; estimating, using the separator network trained to assign weight to the compressed latent space representation, two weight matrices to be multiplied with an output from the encoder network and learning temporal features of a native load and a photovoltaic (PV) generation; transforming, using the decoder network, the weighted compressed latent representation corresponding the native load and the PV generation into time-domain representations from outputs of the encoder network and the separator network; and predicting, using a post-disaggregation adjustment method, the native load and the PV generation at distribution system-level from the transformed time-domain representations corresponding to the native load and PV generation.

Further, some embodiments of the present invention are recognition that an energy disaggregation system is provided for performing energy disaggregation of a distribution system-level net-load measurements of a distribution system using continuous-point-on-wave (CPOW) measurement. The energy disaggregation system may include a network interface controller configured to revieve measurement data of electric signals indicating voltage and current measurements of substations or feeders arranged in the distribution system; a memory configured to store instructions implementing an energy disaggregation method using neural networks including an encoder network, a feature extractor, a separator network, and a decoder network; and a processor coupled with the memory, wherein the processor is configured to execute the instructions that carry out steps of the energy disaggregation method, including: generating, using the encoder network and the measurement data of electric signals, a compressed latent space representation from the net-load time series; converting the net-load time series into the time-frequency domain using a short-time Fourier transform (STFT) method; passing time-domain cotextual information with the converted time-frequency domain representation of net-load time series to the feature extractor trained to accurately extract harmonic features; estimating, using the separator network trained to assign weight to the compressed latent space representation, two weight matrices to be multiplied with an output from the encoder network and learning temporal features of a native load and a photovoltaic (PV) generation; transforming, using the decoder network, the weighted compressed latent representation corresponding the native load and the PV generation into time-domain representations from outputs of the encoder network and the separator network; and predicting, using a post-disaggregation adjustment method, the native load and the PV generation at distribution system-level from the transformed time-domain representations corresponding to the native load and the PV generation.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 3A is a schematic illustrating a separator network, according to embodiments of the present disclosure;

FIG. 3B is a schematic illustrating a RT-GLU block of the separator network, according to embodiments of the present disclosure;

FIG. 5A is a schematic illustrating a training algorithm for using Cony-EDNet+ model, according to embodiments of the present disclosure;

FIG. 5B is a schematic illustrating distribution network structure for synthetic data generation, according to embodiments of the present disclosure;

FIG. 5C is a schematic illustrating hyper parameter settings, according to embodiments of the present disclosure;

FIG. 7 is a schematic illustrating the comparison of performance metrics, according to embodiments of the present disclosure;

FIG. 9 is a schematic illustrating a training algorithm for a ConvED-DAN model, according to embodiments of the present disclosure;

FIG. 11A is a schematic illustrating the domain adaptation results for load disaggregation, according to embodiments of the present disclosure;

FIG. 11B is a schematic illustrating the domain adaptation results for PV disaggregation, according to embodiments of the present disclosure;

Figure 1:
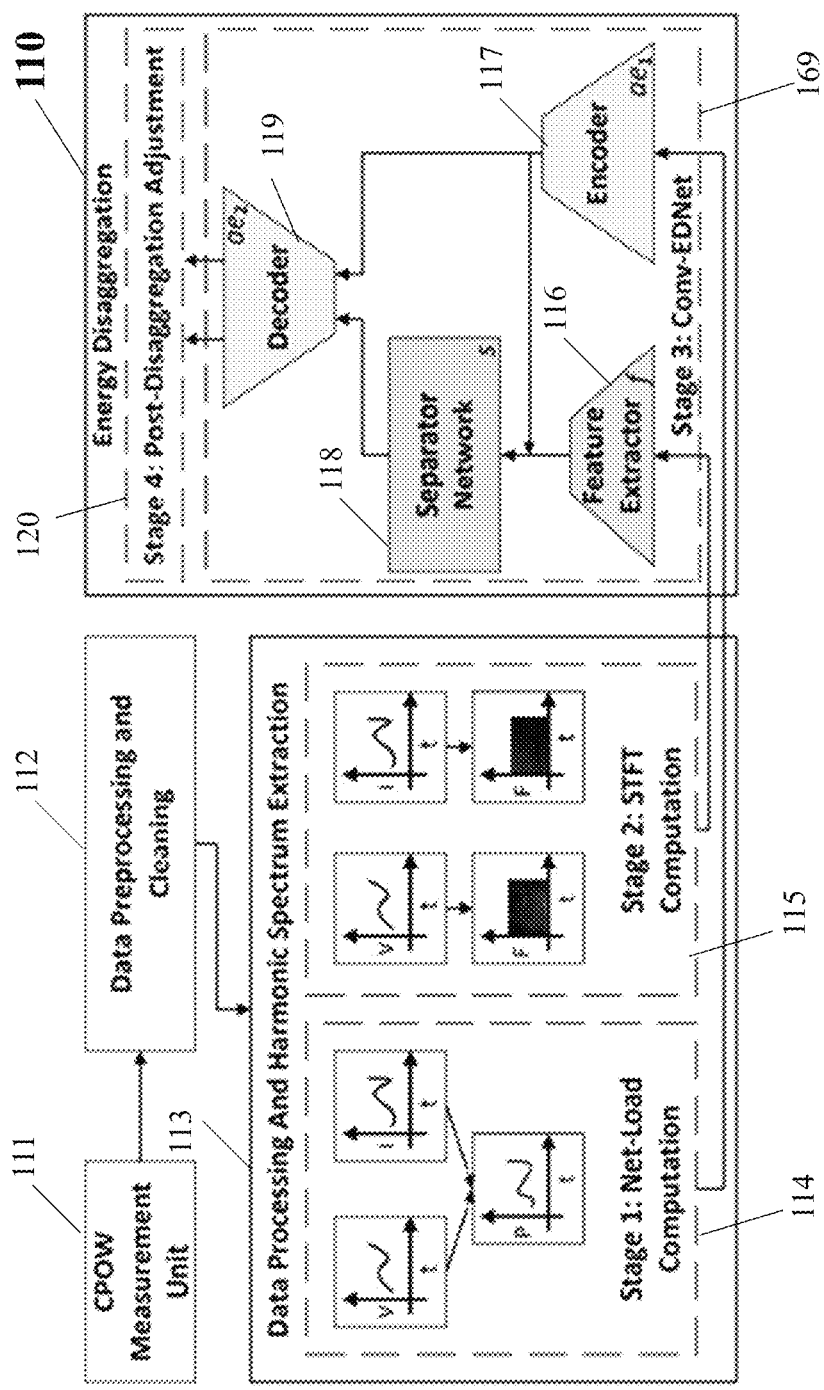
FIG. 1 is a schematic illustrating an energy disaggregation process using a Conv-EDNet model, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Energy disaggregation refers to separating the distribution system-level net-load measurements into native load and photovoltaic (PV) generation. Accurately disaggregating the measurements has become increasingly important due to the increase in the deployment of PV generators and the complexity of operating such renewable energy-rich networks.

Let $\rho^{NL} \in \mathbb{R}^{1 \times T}$ be the measured net-load time series obtained from the voltage and current measurements of the CPOW measurement unit. Similarly, $\rho^{L} \in \mathbb{R}_+^{1 \times T}$ and $\rho^{PV} \in \mathbb{R}_+^{1 \times T}$ be the unobservable native load and PV generation measurements. The relationship between the three is as follows: $\rho^{NL} = \rho^L - \rho^{PV}$. In this disclosure, upper-case boldfaced letters denote matrices, while lower-case boldfaced letters denote vectors.

FIG. 1 is a schematic illustrating the entire process for a distribution system to perform the energy disaggregation task using our disclosed method in this disclosure. The distribution system first collects voltage and current measurements from CPOW measurement units 111, then performs data preprocessing and cleaning 112 to convert raw data into efficient data formats, fill missing values, remove noisy data and outliers, and solve inconsistence. The processed data is then passed to the data processing and harmonic spectrum extraction module 113 to compute net-loads 114 (stage 1) and perform short-time Fourier transform (STFT) 115 (stage 2). The results for module 113 are then passed to energy disaggregation module 110 through Convolutional Energy Disaggregation Network (Conv-EDNet) 169 (stage 3) and post-disaggregation adjustment 120 (stage 4) to get final native load and PV generation prediction results.

Conv-EDNet: Convolutional Energy Disaggregation Network

As shown in FIG. 1, the Conv-EDNet framework 169 is built using four sub-networks, an encoder 117, a feature extractor 116, a separator network 118, and a decoder 119.

Encoder Network

The encoder network 117 generates a compressed latent space representation of $\rho^{NL}$, which is then passed on to the separator network 118 and the decoder network 119. First, the net-load time series $\rho^{NL}$ is segmented into I overlapping time frames of length $\hat{T}$, $\rho_i^{NL} \in \mathbb{R}^{1 \times \hat{T}}$, where i=1, . . . , I, with an overlap of 50%. The encoder uses one-dimensional (1D) convolution operation to transform $\rho_i^{NL}$ into a N×L dimensional representation, $X_{ae_1,i} \in \mathbb{R}^{N \times L}$. The 1D convolution operation followed by a non-linear activation function using a kernel size of K, N output channels, and stride S can be described as follows:

$$X_{ae_1,i} = \mathcal{H}(\rho_i^{NL} \odot \Theta_{ae_1}), \quad (1)$$

where $\Theta_{ae_1} \in \mathbb{R}^{N \times K}$ is the encoder weight matrix, $\odot$ represents the 1D convolution operation, and $\mathcal{H}(\cdot)$ represents the non-linear activation function.

Feature Extractor Network

Figure 2:
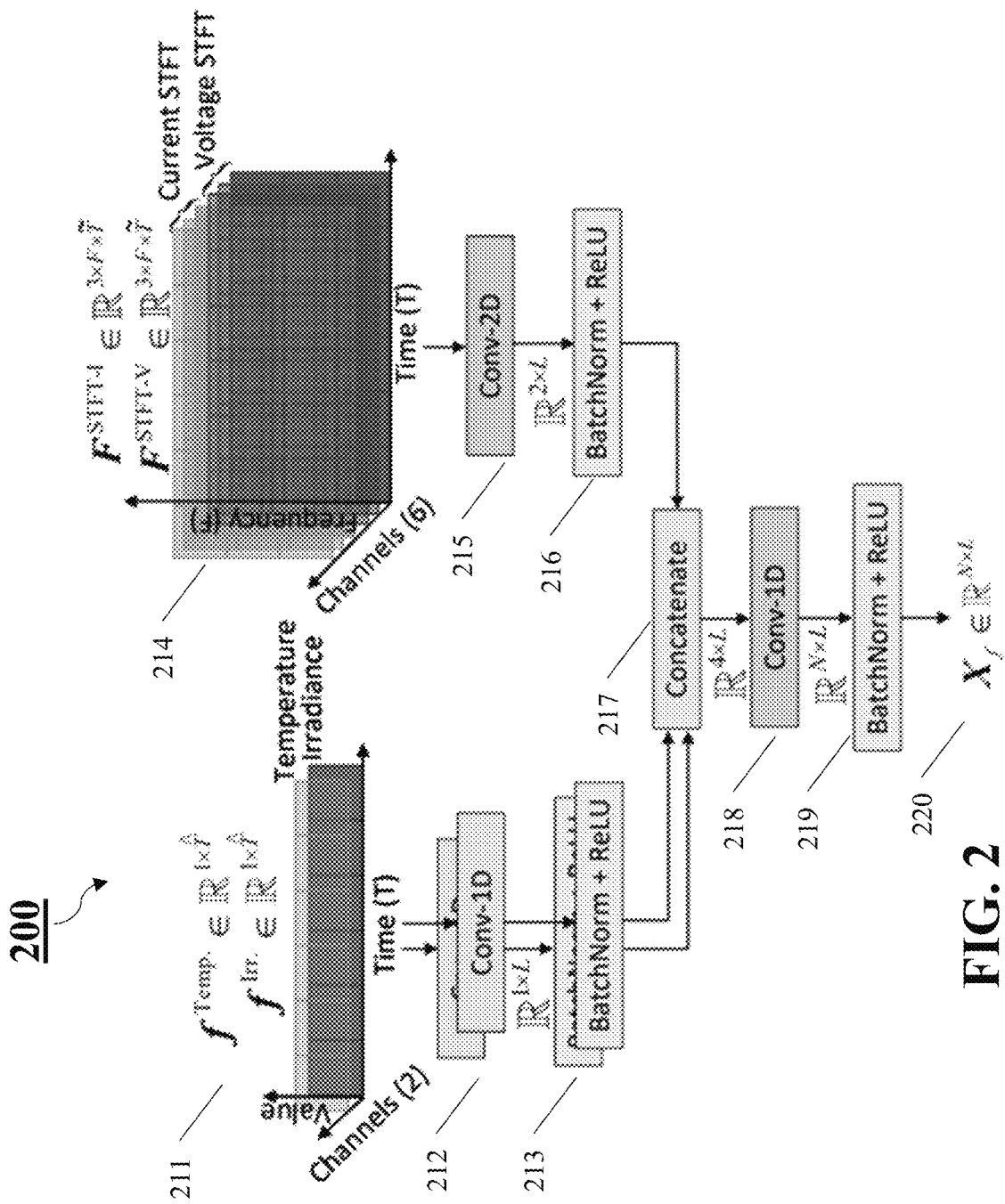
FIG. 2 is a schematic illustrating a feature extractor network, according to embodiments of the present disclosure.

FIG. 2 is a schematic illustrating a feature extractor network 200. The goal of the feature extractor network is to utilize the net-load data and the supplemental contextual data to assist with the disaggregation task. The CPOW unit 111 measures the individual phase current and voltage, from which the aggregated net-load value is computed 114. This data also helps supplement the disaggregation task by extracting information on harmonic content 115, which helps quantify PV generation by assisting in detecting the generator connectivity status and generator faults. Hence, a separate dedicated network 200 is developed with the sole responsibility of extracting vital features from the instantaneous voltage and current measurement data along with the irradiance and temperature measurements.

The feature extractor network identifies, using the STFT method, the harmonic features introduced in the distribution system by inverter-based PV generation. The PV generator is connected with the distribution system through a DC/AC inverter which generates harmonics into electrical signals that can be used for identifying PV generation and generator status. The inverter is used to convert powers from direct current (DC) into alternating current (AC).

The feature extraction process follows a two-step approach. First, the instantaneous time domain CPOW voltage and current measurements ($f^V$, $f^I \in \mathbb{R}^{1 \times \hat{T}}$) are converted into a time-frequency domain using short-term Fourier transform (STFT) 115. Let the per-phase voltage and current STFT spectrograms be denoted by $F^{STFT-V} \in \mathbb{R}^{F \times \hat{T}}$, and, $F^{STFT-I} \in \mathbb{R}^{F \times \hat{T}}$ 214, where F denotes the spectrogram height and $\hat{T}$ is the total window count (spectrogram width) for a signal of length $\hat{T}$. Second, the time domain contextual information such as temperature ($f^{Temp} \in \mathbb{R}^{1 \times \hat{T}}$) and irradiance ($f^{Irr} \in \mathbb{R}^{1 \times \hat{T}}$) 211 along with the previously obtained time-frequency domain representations are passed to a feature extraction network as shown in FIG. 2.

For Conv-EDNet, the rectified linear unit (ReLU) is used as the activation function to ensure a non-negative latent space representation. The contextual information for temperature and irradiance 211 are each passed through a unique 1D convolutional layer 212 followed by a non-linear activation 213 to obtain the time domain latent representation. The STFT spectrograms 214 of the instantaneous voltage and current corresponding to the three different network phases are concatenated and passed through multiple 2D convolutional layers 215 and a non-linear activation 216 for obtaining the reduced dimension latent representation. Lastly, the time domain and time-frequency domain latent representations are concatenated 217 and passed through a 1D convolutional layer 218 and activation 219 with its hyperparameters selected such that the output 220 dimension matches those of the encoder output.

Separator Network

FIG. 3A is a schematic illustrating the separator network 300. The role of the separator network 300 is to estimate the two weight matrices, $X_{s,i}^{PV}, X_{s,i}^{L} \in \mathbb{R}_{[0,1]}^{N \times L}$, 310 to be multiplied element-wise with the encoder output $X_{\alpha e_1, i}$ 301. Each separator matrix learns and assigns a unique weight to the encoder output. By assigning these weights, the key values in the encoder output, which are most significant for load or PV generation can be determined. To ensure that the weights are scale-invariant, the following constraint is added using a sigmoid activation function 309: $X_{s,i}^{PV} + X_{s,i}^{L} = 1$, where 1 denotes an N×L matrix of ones.

The separator network must learn the temporal features of the load and PV generation. Hence, to add a temporal learning mechanism, we propose using temporal convolutional network (TCN). This network consists of sequential layers of stacked dilated 1D TCN blocks, with each block consisting of a gated residual network. Within each sequential layer, the TCN blocks are stacked such that the dilation factor goes on exponentially increasing as a function of the number of stacked layers, e.g., as the stack keeps getting taller. The exponential increase in dilation factor is designed to ensure a sufficiently large temporal receptive field size to facilitate the modeling of long-range temporal features observed within the load and PV generation time series. The Conv-EDNet consists of M 1D TCN blocks with the dilation factors taking the values 1,2,4,8, . . . , $2^{M-1}$. The stacked sequence is then repeated R times sequentially, 304, 305 and 306. The detailed representation of this design is shown in FIG. 3A.

Each 1D TCN block is carefully designed using gated linear units (GLUs) and residual learning architecture. Gating mechanisms are introduced to alleviate the vanishing gradient problems during training via backpropagation through time. We modify the GLU by incorporating TCNs and residual learning into a new residual block shown in FIG. 3B. The overall combination helps add temporal learning component along with addressing problems of vanishing gradients and degradation. Hereafter, this block is addressed as residual temporal GLU (RT-GLU) 320. The RT-GLU block has two outputs, i.e., the residual output 330 and the skip-connection 331. The residual output of one RT-GLU block acts as the input to the next consecutive block. The skip-connection outputs M stacked blocks of R sequential layers are summed up 311 and passed on to the final 1D convolutional layer, 307 and 308 of the separator network. Herein, the output channel count is selected as 2N, with the first and second set of N channels forming the weighting function of PV generation and native load, respectively.

To summarize, given the concatenated encoder output and the feature extractor network output 301 with dimension 2N×L, the bottleneck convolutional layer, 302 and 303 with B channels, kernel size K, and stride S produces a B×L dimensional output, where B<N. The first 1D convolutional layer, 322 and 323 of the RT-GLU block changes the channel count of the input from B 321 to H 322, keeping the kernel size and stride fixed at K and S, respectively. The output of the dilated convolutional layers, 324 and 325 is padded to ensure a fixed length of L across all N channels. The final 1D convolutional layer, 307 and 308 of all RT-GLU blocks is sized to produce an output of dimension B×L. In the proposed RT-GLU block, the output path 330 and the skip-connection path 331 have the same dimension; however, this is not mandatory and can be changed while performing hyperparameter tuning. Lastly, the final 1D convolutional layer, 307 and 308 doubles the channel count to 2N so as to produce separate weighting functions of same dimensions corresponding to PV generation and native load.

Decoder

The decoder transforms the weighted latent representations corresponding to the load and PV generation back into their time domain representations. For doing so, 1D transposed convolutions are used, which can be represented as follows:

$$\rho_i^{PV} = (X_{\alpha e_1, i} \otimes X_{s,i}^{PV}) \circledast \Theta_{\alpha e_2}, \qquad (2)$$

$$\rho_i^{L} = (X_{\alpha e_1, i} \otimes X_{s,i}^{L}) \circledast \Theta_{\alpha e_2}, \qquad (3)$$

where $\Theta_{\alpha e_2} \in \mathbb{R}^{N \times K}$ is the decoder weight matrix, $\otimes$ represents element-wise multiplication, and $\circledast$ represents the 1D transposed convolution.

Conv-EDNet+: Add Adversarial Learning into Convolutional Energy Disaggregation Network To further enhance the disaggregation quality and robustness of Conv-EDNet, we extend the proposed model with an adversarial learning component. Following the generative adversarial networks (GAN) terminology, the basic Conv- EDNet model will be referred to as a generator ($\mathcal{G}$). A new component called the discriminator ($\mathcal{D}$) is added to facilitate adversarial learning. The adversarially modified Conv-EDNet, referred to as Conv-EDNet+ hereafter, is obtained by adding a discriminator network to the existing Conv-EDNet model.

Adversarial training means that the $\mathcal{G}$ is trained to trick the $\mathcal{D}$ into believing that the sequences predicted by $\mathcal{G}$ are the actual measurements. This relationship is achieved by solving a two-player min-max game as shown in (4). The $\mathcal{D}$ is trained to maximize the probability of correctly classifying the real samples (i.e., the measurements) and the generated samples (produced by $\mathcal{G}$). In contrast, $\mathcal{G}$ is trained to produce output samples that are hard correctly distinguish by $\mathcal{D}$. Thus, we have the following min-max game for ED:

$$\min_{\mathcal{G}} \max_{\mathcal{D}} \left( E_{x \in p^{NL}}[\log \mathcal{D}(x)] + E_{x \in p^{NL}}[\log(1 - \mathcal{D}(\mathcal{G}(x)))] \right). \quad (4)$$

The input to $\mathcal{G}$ is the net load measurement, $\rho_i^{NL}$, and the input to $\mathcal{D}$ is shuffled between $\rho_i^{NL}$ and $\rho_i^{L} - \rho_i^{PV}$. To ensure $\mathcal{D}$ learns the temporal features of net-load measurements and does not get easily tricked by the generator, we propose a deeper network for $\mathcal{D}$ with embedded regressive temporal characteristics by using gated recurrent units (GRUs). The convolutional layers perform the task of feature extraction, while the GRUs help model the temporal properties of net-load. Lastly, the output of the GRU layer is passed to sequentially stacked linear layers with decreasing dimensions, which output the classification probability value. The probability value indicates whether the input data is the actual CPOW measurement data or the generated data.

Figure 4:
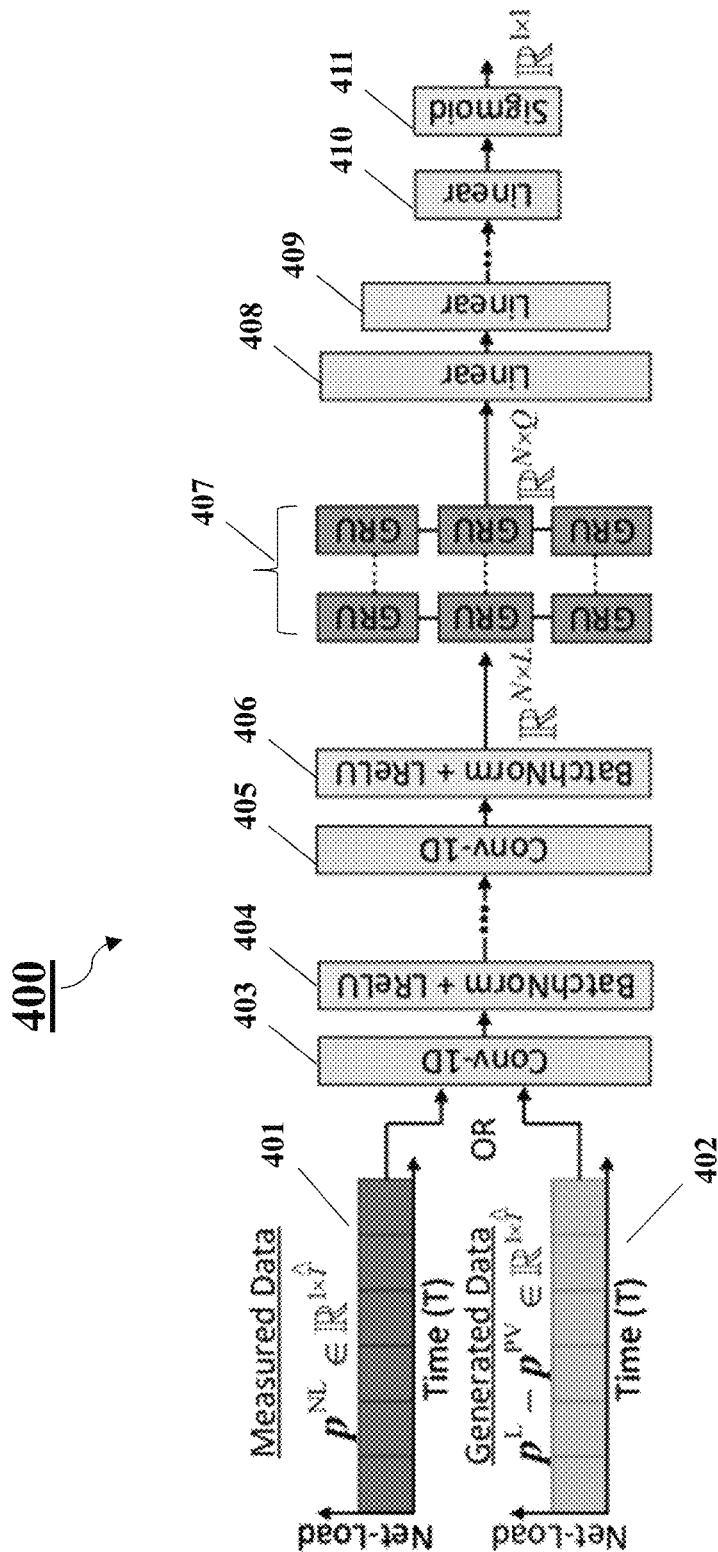
FIG. 4 is a schematic illustrating a Conv-EDNet+ model, according to embodiments of the present disclosure.

The structure of the $\mathcal{D}$ 400 is shown in FIG. 4. To summarize, given the discriminator input time series data with dimension 1×T̂, 401 and 402, the final output of the stacked 1D convolutional layers, 403, 404, 405 and 406, takes the dimension N×L. The convolutional layers are stacked in a manner such that the channel size successively goes on increasing from 1 to N. Then, using the GRU 407 with a hidden state of dimension Q, the convolutional layer output is transformed into a N×Q dimensional output. This output is flattened and passed on to the stacked linear layers, 408, 409, and 410 whose output dimension goes on sequentially decreasing by a factor of 2. Finally, a sigmoid activation layer 411 is added to ensure that the output probability value is in the range [0, 1].

Training Conv-EDNet And Conv-EDNet+

An end-to-end disaggregation approach in the time domain allows using element-wise mean squared error (MSE) as the loss function for training the different blocks of the Cony-EDNet model. Let $\bar{\rho}_i^{L}$ and $\bar{\rho}_i^{PV}$ be the ground truth values of the native load and PV generation, respectively. The disaggregation loss function is modeled as follows:

$$\mathcal{L}^{MSE} = \sum_{j \in \{L, PV\}} (p_i^j - \bar{p}_i^j)^2 / \hat{T}. \quad (5)$$

For Conv-EDNet+ model, along with (5), the binary cross-entropy loss function used for training the $\mathcal{G}=$ and $\mathcal{D}$ is shown below:

$$\mathcal{L}_{\gamma}^{BCE} = -[\gamma \log \mathcal{G}(\rho_i^{NL}) + (1-\gamma)\log(1-\mathcal{G}(\mathcal{D}(\rho_i^{NL})))], \quad (6)$$

where $\gamma$ is the ground truth value. If the input to $\mathcal{D}$ is the actual measurement data $\rho_i^{NL}$, then $\gamma=1$, and if the input is the generated data $\rho_i^{L} - \rho_i^{PV}$, then $\gamma=0$.

All the Conv-EDNet model blocks are jointly optimized. The model is trained for a pre-determined number of epochs (E), and the weights of all the different components are updated simultaneously to minimize the loss function (5). The training procedure for Conv-EDNet+ is shown in FIG. 5A. For notation simplicity, the subscript i is dropped. For the first Ê epochs, only the $\mathcal{G}$ is trained using the loss function (5). Beyond Ê epochs, $\mathcal{G}$ and $\mathcal{D}$ are jointly trained. While training $\mathcal{G}$, the loss of $\mathcal{D}$ is computed by using the true label 1 instead of using the fake label 0 (step 9). This is done since the goal of $\mathcal{G}$ is to trick the $\mathcal{D}$. The remainder of the training procedure is similar to that of the conventional GANs.

Post-Disaggregation Adjustment

For further improvement in the disaggregation accuracy and quality, we add a post-disaggregation adjustment stage based on a post-disaggregation adjustment method. This stage ensures that the inherent physical characteristics behind the net-load measurements are retained. After performing net-load disaggregation, the obtained native load and PV generation values must satisfy the relationship $\rho^{NL} = p^L - \rho^{PV}$. However, this cannot be guaranteed due to prediction errors. The predictions will be closer to the ground-truth values but will not necessarily satisfy the condition $\rho^{NL} = p^L - p^{PV}$. Hence, we add a post-disaggregation quadratic programming-based optimization problem to make the final corrections to the disaggregated data. Let $\rho^{NL}$ be the measured net-load data, $p^L$ and $p^{PV}$ be the Conv-EDNet disaggregated output, and $\hat{\rho}^L$ and $\hat{\rho}^{PV}$ be the post-disaggregation adjusted values. The optimization problem can then be formulated as:

$$\min_{p^{PV}, p^L} \sum_{t=0}^{T} \mu^{PV} (p^{PV}(t) - \hat{p}^{PV}(t))^2 + \mu^L (p^L(t) - \hat{p}^L(t))^2 \quad (7)$$

$$\text{s.t. } p^{NL}(t) = p^L(t) - p^{PV}(t), \quad (8)$$

$$p^{PV}(t) \geq 0, \quad (9)$$

$$p^L(t) \geq 0, \quad (10)$$

where $\mu^{PV}$ and $\mu^L$ are weights assigned to PV and load, respectively, in the objective function. The values of the weights can be determined by assessing the training loss of Conv-EDNet. $\mu^{PV}$ and $\mu^L$ can be assigned values that are inversely proportional to the corresponding training loss.

Case Study on Conv-EDNet and Conv-EDNet+

Numerical simulations are performed using Conv-EDNet and Cony-EDNet+. Due to limited deployment of CPOW measurement units in distribution grids and privacy/security concerns, this type of data is not publicly available. Hence, we rely on synthetic CPOW data obtained using Matlab-Simulink. Care has been taken to insert random noise into the synthetic data to reflect measurement errors and prevent the proposed disaggregation model from learning the synthetic network model as is.

FIG. 5B is a schematic illustrating distribution network structure for synthetic data generation, according to embodiments of the present disclosure according to some embodiments of the present invention.

The network model 500 built is configured to include a transmission network 510, a substation 520 including a CPOW-MU 521 connected to a distribution feeder 530 including a MW PV generator 531, and residential loads 532, as shown in FIG. 5B. Currently, only one CPOW unit located at the feeder head is considered. The PV generator rating is 1 MW, and the peak aggregated demand is 15 MW. The data sampling frequency of 3 kHz is selected to meet the criteria of CPOW measurements. A holistic synthetic dataset is then obtained by considering different days of the week, different seasons, different cloud-cover scenarios, and different network fault scenarios. The total training data spans over 15 days and the testing data over 5 days. Owing to the limited computation resource availability, we down-sample the encoder input from 3 kHz to 0.2 kHz. However, the feature extractor network is provided with 3 kHz data without down-sampling to ensure that the harmonic features are accurately extracted. The hyperparameters and their values are shown in FIG. 5C. All experiments are implemented using an NVIDIA Titan X (Pascal) GPU with 12 GB RAM using Python and Pytorch.

Herein, we compare the performance of the Conv-EDNet and Cony-EDNet+ approach with the existing approaches, Conv-TasNet proposed by Y. Luo et al (see background section for more information) for audio source separation, and DAE-Net (denoising autoencoder) method proposed by Kelly and W. Knottenbelt at a paper titled as "Neural NILM: Deep neural networks applied to energy disaggregation," (in Proceedings of the 2nd ACM Int. Conf. on embedded systems for energy-efficient built environments, 2015, pp. 55-64). The models for the different methods are accordingly modified for CPOW data, trained, and evaluated independently.

Figure 6A:
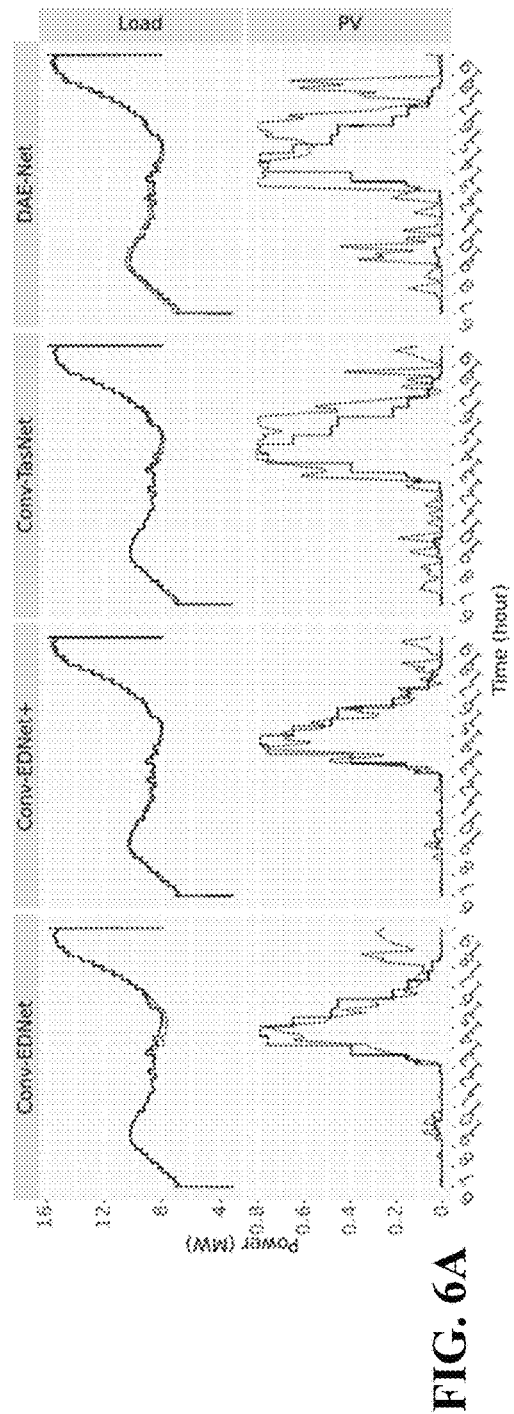
FIG. 6A is a set of plots illustrating the comparison of predictions using Conv-EDNet, Conv-EDNet+, Conv-TasNet, and DAE-Net under normal operating condition, according to embodiments of the present disclosure.
Figure 6B:
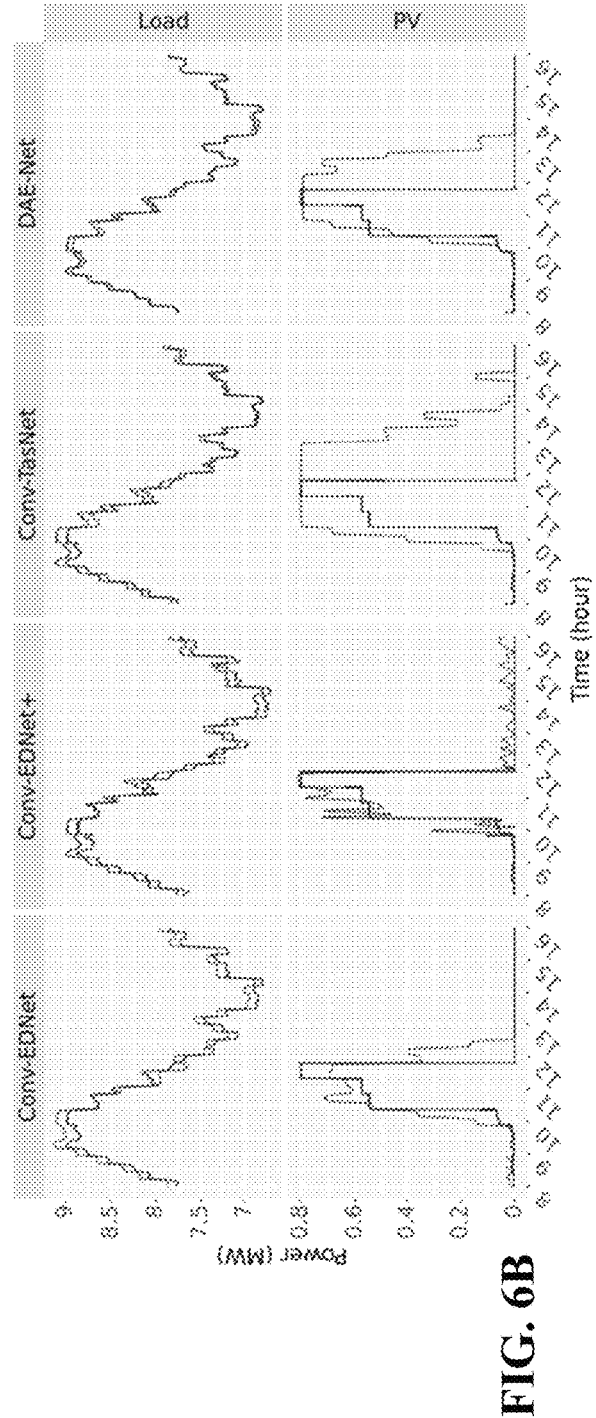
FIG. 6B is a set of plots illustrating the comparison of predictions using Conv-EDNet, Conv-EDNet+, Conv-TasNet, and DAE-Net under PV generator fault condition, according to embodiments of the present disclosure.

FIG. 6A and FIG. 6B show the results under normal operation and PV generator fault condition, respectively. FIG. 7 shows performance metrics quantifying the predictions made by the four methods. The metrics include mean absolute error (MAE), root mean squared error (RMSE), and signal aggregate error (SAE). From FIG. 7, we observe that the Conv-EDNet+ model outperforms all the other compared methods while the Conv-EDNet is the second-best performing model. These results can be corroborated using FIG. 6A, which shows the predictions for a partially cloudy day, wherein the day transitions from overcast to sunny. For load predictions, similar and accurate predictions are observed for all the compared methods, with Conv-EDNet+ predictions being closest to the ground truth. For PV predictions, we observe that the Conv-EDNet and Conv-EDNet+ models are accurately able to detect the onset of PV generation. This can be attributed to the novel feature extraction module, which has enhanced PV generation detection capability owing to its dependence on irradiance and STFT-based harmonic features. Due to its absence in the remaining two methods, they underperform, with DAENet producing the least accurate results. For the remainder of the PV generation profile, we observe that Conv-EDNet+ significantly outperforms amongst the methods compared.

FIG. 6B shows the predictions on a partly cloudy winter day for a fault event wherein the PV generator was disconnected from the grid at noon. We observe that Conv-EDNet+, followed by Conv-EDNet with a small time-lag, is accurately able to detect the fault and immediately drop the PV generation value. The Cony-TasNet and the DAE-Net are slow in detecting the fault. Thus, Conv-EDNet and Conv-EDNet+ outperform the traditional approaches even when CPOW data is used for training all the approaches. This demonstrates that the use of CPOW data combined with a dedicated network for time-frequency domain feature characterization results in a sharp increase in prediction accuracy.

ConvED-DAN: Combine Domain Adaptation with Conv-EDNet+

Accurately disaggregating the measurements has become increasingly important due to the increase in the deployment of PV generators and the complexity of operating such renewable energy-rich networks. The model training requires diverse and detailed labeled data for supervised deep learning networks. Gathering this detailed data is time-consuming, expensive, and in most cases is difficult to obtain from the utilities owing to the privacy concerns. This disclosure presents a convolutional energy disaggregation network with domain adaptation (ConvED-DAN), an extension of our above-mentioned Conv-EDNet+. Through utilizing domain adaptation, the proposed energy disaggregation models can be trained by using synthetic datasets, but be applied for prediction on real-world data.

In power system applications, obtaining real-world field data is challenging. To demonstrate deep learning applications for numerous power system applications, synthetically generated data is used. This data is mainly obtained using computer simulations, which may not represent the actual system. The size of the simulated data may not be adequate to ensure robust model training. To tackle such issues, we propose using domain adaptation, a subcategory of transfer learning. Herein, the training data is categorized into two, i.e., the source domain data and the target domain data. The source domain data is a detailed labeled dataset, while the target domain data mainly consists of the training features but not the labels. Herein, the synthetic generated data used for training the model is the source domain data. The unlabeled real-world data used for testing the neural network model is the target domain data. Note that the source and target domain data have the same feature space but different data distributions. Domain adaptation is suitable for energy disaggregation since the underlying task remains the same. The only difference is that the training data has a different distribution from the actual real-world data.

The need for performing domain adaptation to improve model robustness can be mathematically described when deployed on real-world data. Consider the data represented as follows: $\mathcal{D} = \{(x_1, y_1), (x_2, y_2), \ldots, (x_n, y_n)\} = \{X, \mathcal{Y}, P(X)\}$, where X is the feature space, $\mathcal{Y}$ is the label space, and $P(X)$ is the marginal probability distribution. Accordingly, let the source domain data be represented as $\mathcal{D}_s = \{X_s, \mathcal{Y}_s, P_s(X_s)\}$ and the target domain data as $\mathcal{D}_T = \{X_T, \mathcal{Y}_T, P_T(X_T)\}$. Note that in the target domain data, $\mathcal{Y}_T$ is unknown. Also, the simulation measurements and the actual field measurements have a different distribution, i.e., $P_s(X_s) \neq P_T(X_T)$. Hence, $P_s(\mathcal{Y}_s) \neq P_T(\mathcal{Y}_T)$. If $P(X, \mathcal{Y})$ is the joint distribution of the feature-label space, then using the above reasoning, we obtain that $P_s(X_s, \mathcal{Y}_s) \neq P_T(X_T, \mathcal{Y}_T)$. This makes the task of domain adaptation necessary.

Repurposing the Discriminator to Perform Domain Adaptation

Figure 8:
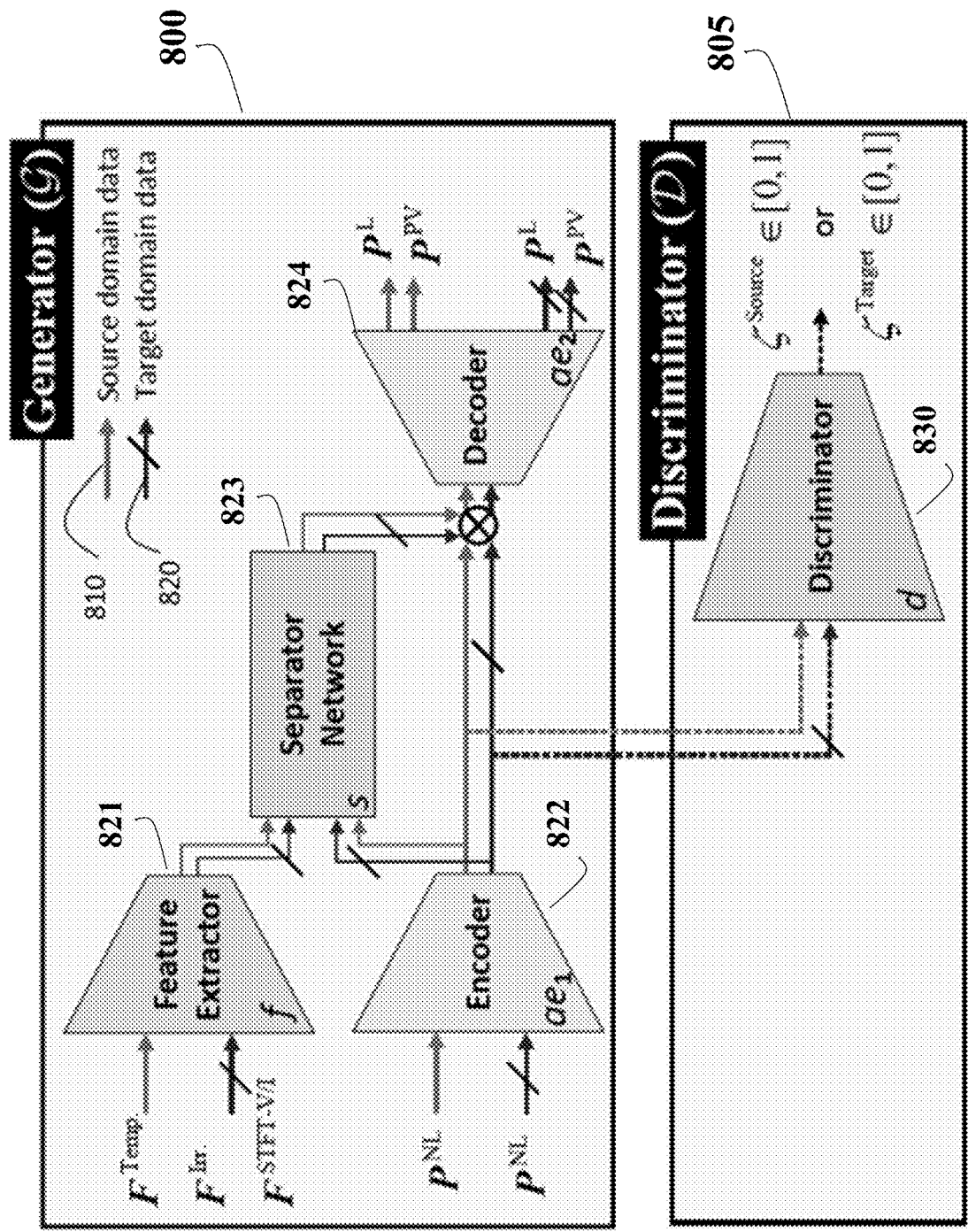
FIG. 8 is a schematic illustrating a ConvED-DAN model, according to embodiments of the present disclosure.

In Conv-EDNet+, the network consists of the Conv-EDNet energy disaggregation model (a generator 800) combined with a discriminator network 805 of a discriminator 830 to perform adversarial training. The generator 800 includes a feature extractor 821, an encoder 822, a separator network 823, and a decoder 824. To incorporate domain adaptation, we repurpose the discriminator network to perform the task of domain adaptation. The underlying idea is that the discriminator adversarially trains the model using the feature space instead of the disaggregated time-series used in Conv-EDNet+. The goal is to minimize the deviation between the source domain and the target domain feature space. FIG. 8 shows the repurposed Conv-EDNet+ model for performing domain adaptation tasks. Since the ground truth labels are available for the source domain data 810, we can compute the mean squared error (MSE) prediction loss for the source domain data. However, this cannot be performed since we assume the non-availability of target domain data 820. Hence, we use the MSE loss function on the feature space to train the network parameters using source domain data. Then, the generator 800 is updated using a weighted function corresponding to the MSE loss value on source domain data and the MSE loss value on the feature space. The feature space MSE value aims at minimizing the gap between the source domain data 810 and the target domain data 820 feature space. Lastly, the discriminator 830 is updated using the binary cross-entropy loss, which computes the probability of the input feature space being obtained from the source or target domain data.

Unlike Conv-EDNet+, the discriminator 830 for ConvED-DAN is primarily used to detect source and target domain data in the feature space. Hence, the discriminator need not be enhanced with temporal learning capabilities, as shown for Conv-EDNet+. Therefore, we modify the discriminator to a simplified one consisting of sequential fully connected layers with decreasing dimensions. First, two successive fully connected layers are connected through activation and dropout layers. The choice of activation function is Leaky ReLU. The final layer of the discriminator is the sigmoid activation function, which outputs the probability of the input data being from the source domain or target domain dataset. Finally, the output of the penultimate fully connected layer is used to compute the feature space MSE loss.

Next, we describe the loss functions used. Refer to Conv-EDNet/Conv-EDNet+ model for the nomenclature. The following loss function is used to train the generator 800:

$$\mathcal{L}^{MSE,Source} = \sum_{j \in \{L,PV\}} \left( p_i^{Source,j} - \overline{p}_i^{Source,j} \right)^2 / \hat{T}, \quad (11)$$

$$\mathcal{L}^{MSE,Feature} = \left( \overleftarrow{f}_i^{Source} - \overleftarrow{f}_i^{Target} \right)^2 / \hat{T}, \quad (12)$$

$$\mathcal{L}^{MSE} = \mathcal{L}^{MSE,Source} + \delta \mathcal{L}^{MSE,Feature}, \quad (13)$$

where $\mathcal{L}^{MSE,Source}$ is the mean squared disaggregation loss over the source domain predictions, $\mathcal{L}^{MSE,Feature}$ is the mean squared loss between the source and target domain feature space, and $\mathcal{L}^{MSE}$ is the total generator training loss with the feature space loss being weighted by $\delta$. f is the feature space vector for either the source domain data or target domain data obtained from the output of the encoder and $\overleftarrow{f}$ is the discriminator's penultimate layer output. To train the discriminator, a binary cross-entropy loss function is used:

$$\mathcal{L}_\gamma^{BCE} = -[\gamma \log \mathcal{D}_{(f^{Source})} + (1-\gamma) \log(1 - \mathcal{D}_{(f^{Target})})], \quad (14)$$

where $\gamma$ is the ground truth value. If the input to $\mathcal{D}$ is the source domain data $f^{Source}$, then $\gamma=1$, and if the input is target domain data $f^{Target}$, then $\gamma=0$.

FIG. 8 shows the framework of the ConvED-DAN model. The overall training algorithm is shown in FIG. 9.

Test Results for ConvED-DAN

First, we begin by analyzing the data distributions. Herein, due to the lack of availability of actual data, we use data corresponding to the same day of the same month across two different years. The first year represents the source domain data, while the second represents the target domain data.

Figure 10A:
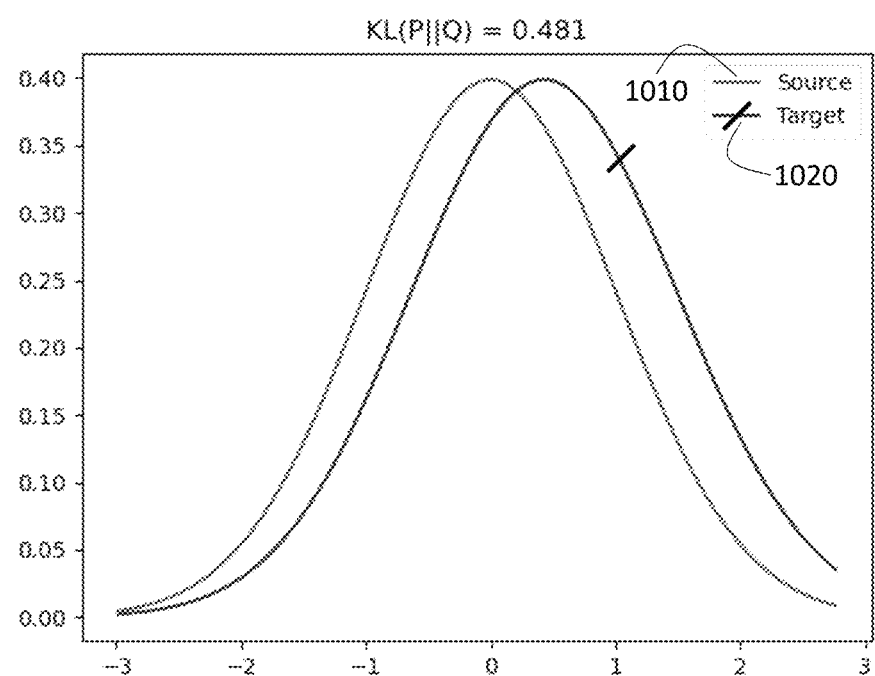
FIG. 10A is a schematic illustrating source and target domain data distributions for the net-load measurement, according to embodiments of the present disclosure.
Figure 10B:
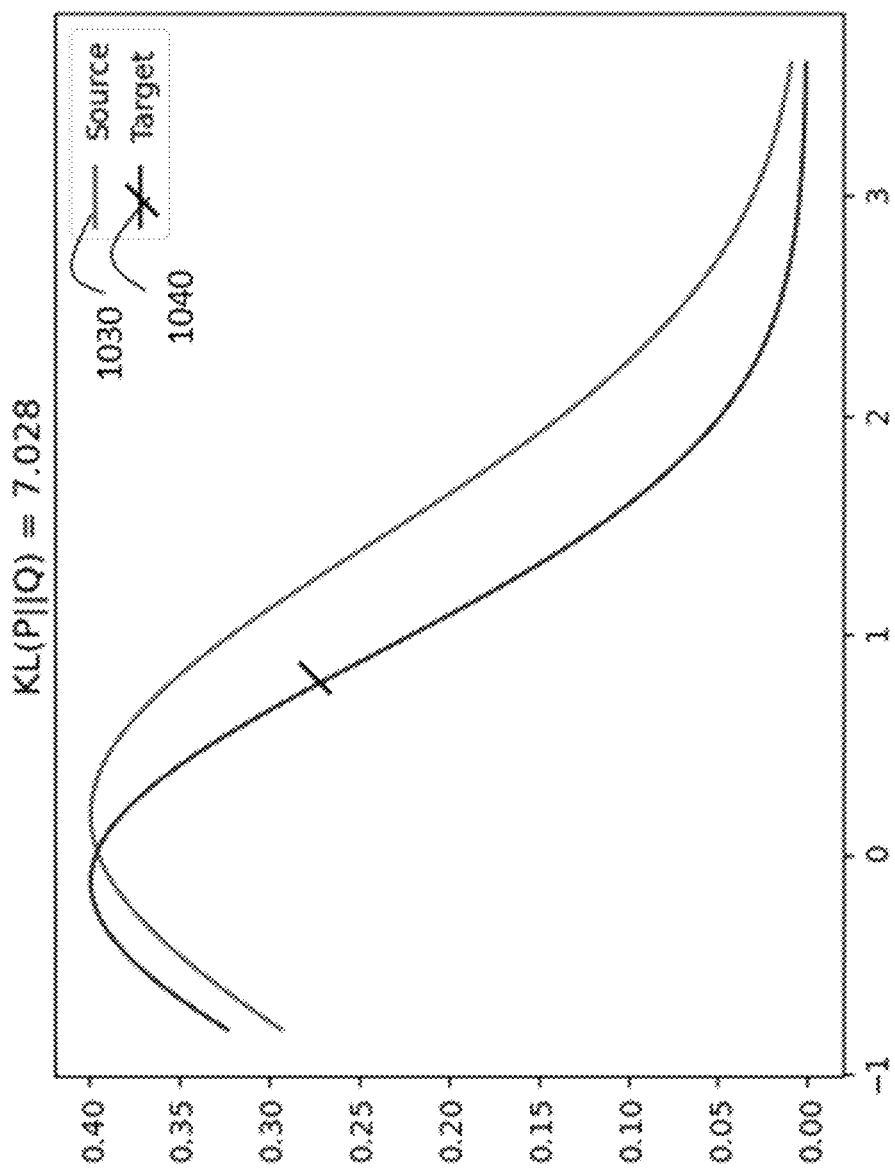
FIG. 10B is a schematic illustrating source and target domain data distributions for PV generation, according to embodiments of the present disclosure.
Figure 10C:
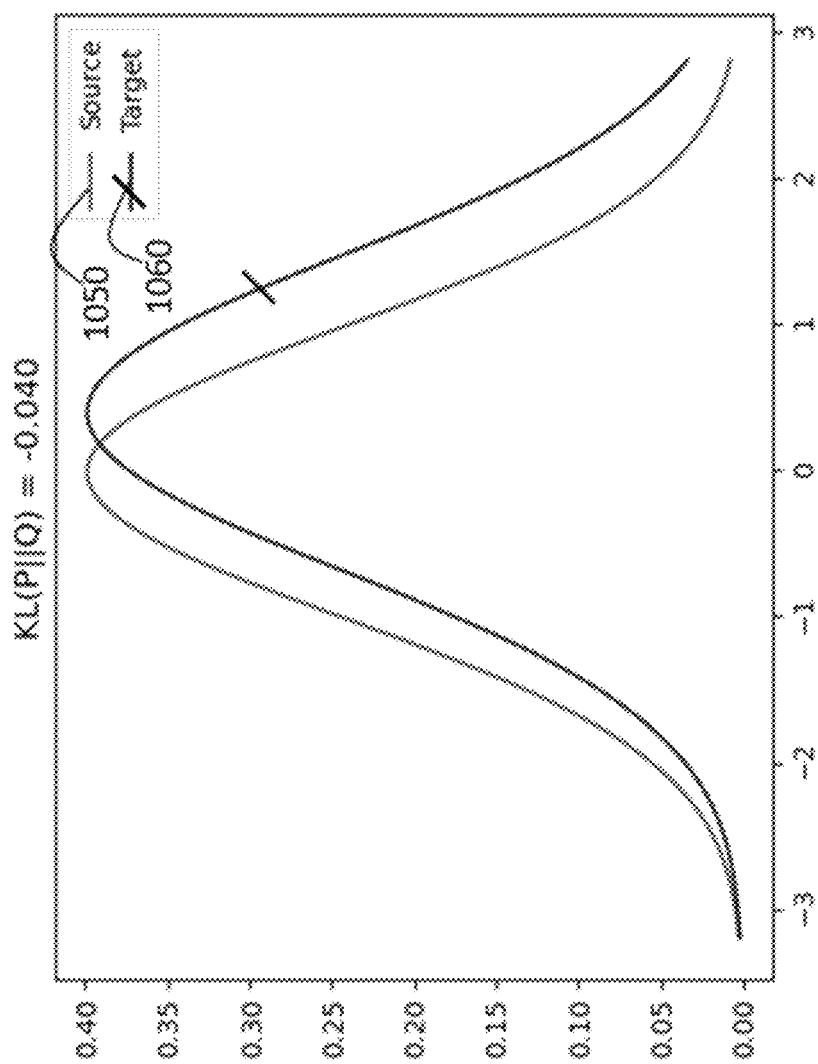
FIG. 10C is a schematic illustrating source and target domain data distributions for native load, according to embodiments of the present disclosure.

FIG. 10A shows the Kullback-Leibler (KL) divergence between the distribution of source and target domain data, 1010 and 1020 for the net-load measurements. FIG. 10B show the KL divergence between the source and target domains, 1030 and 1040 for the PV generation data. FIG. 10C shows the KL divergence between the source and target domains, 1050 and 1060 for the native load data.

We can observe the distribution shift between the target and source domain data from the above figures. This validates the domain adaptation task. Next, we show the results of performing domain adaptation.

FIG. 11A and FIG. 11B summarize the prediction results for disaggregated load and PV generation. First, we observe that the performance of source domain data using a model trained on the source domain is superior to all. The performance drops when the model is trained using source domain data and evaluated on target domain data. Next, using domain adaptation (corresponding rows indicated as "source→Target" in the figures), we observe that the performance of domain adapted model on source domain data slightly drops. However, superior predictions are obtained when the target data is evaluated on domain adapted model. This shows that by performing domain adaptation, the performance on source domain data drops slightly, but a noticeable improvement on the target domain data is observed. To conclude, training models for performing domain adaptation involve a tradeoff between the performance on source domain data and the performance on minimizing the feature gap between the source and target domain data.

Lastly, we visualize the effect of domain adaptation on the feature space. We extract the feature space obtained on source and target domain data and reduce it to a two-dimensional space using t-distributed stochastic neighbor embedding (t-SNE).

Figure 12A:
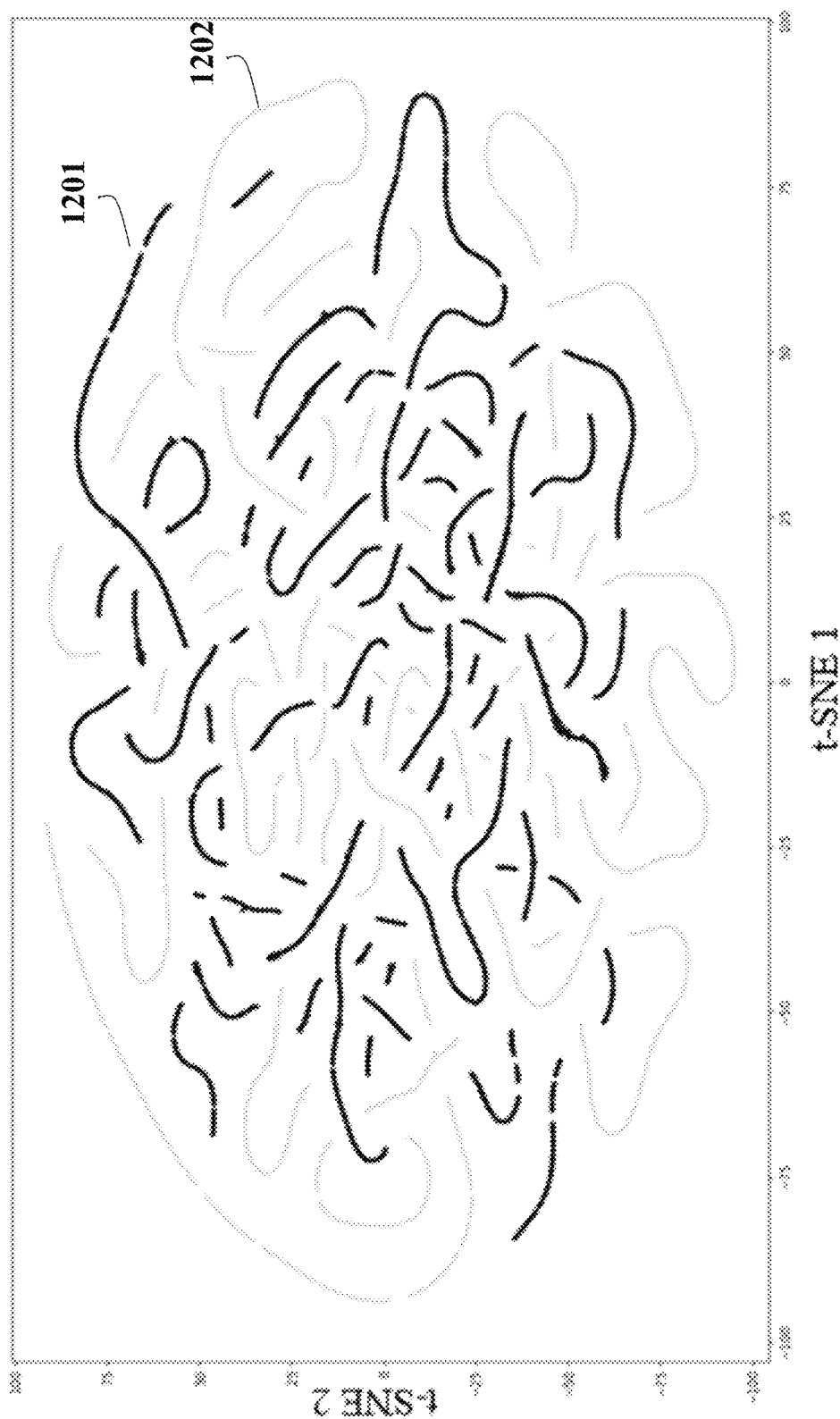
FIG. 12A is a schematic illustrating the visualization of feature space using domain adaptation, according to embodiments of the present disclosure.

FIG. 12A is a schematic illustrating the visualization of feature space using domain adaptation, in which 1201 and 1202 stand for the target domain data and the source domain data, respectively.

Figure 12B:
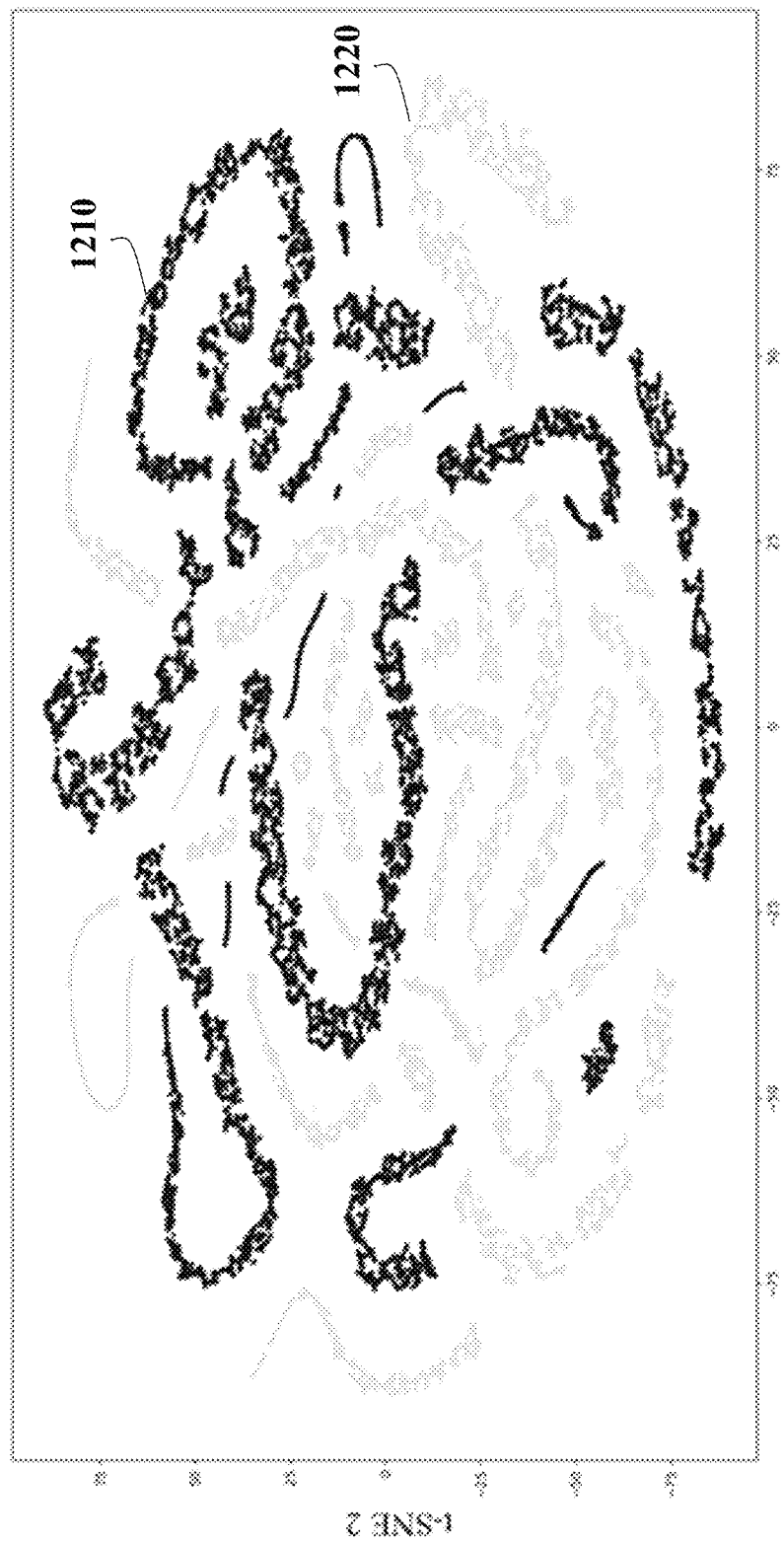
FIG. 12B is a schematic illustrating the visualization of feature space without domain adaptation, according to embodiments of the present disclosure.

FIG. 12B is a schematic illustrating the visualization of feature space without domain adaptation, in which 1210 and 1220 stand for the target domain data, and the source domain data, respectively.

As indicated in FIG. 12A, the source domain data 1202 and target domain data 1201 feature space significantly overlaps each other by using domain adaptation.

An Energy Disaggregation System for a Power Distribution System

Figure 13:
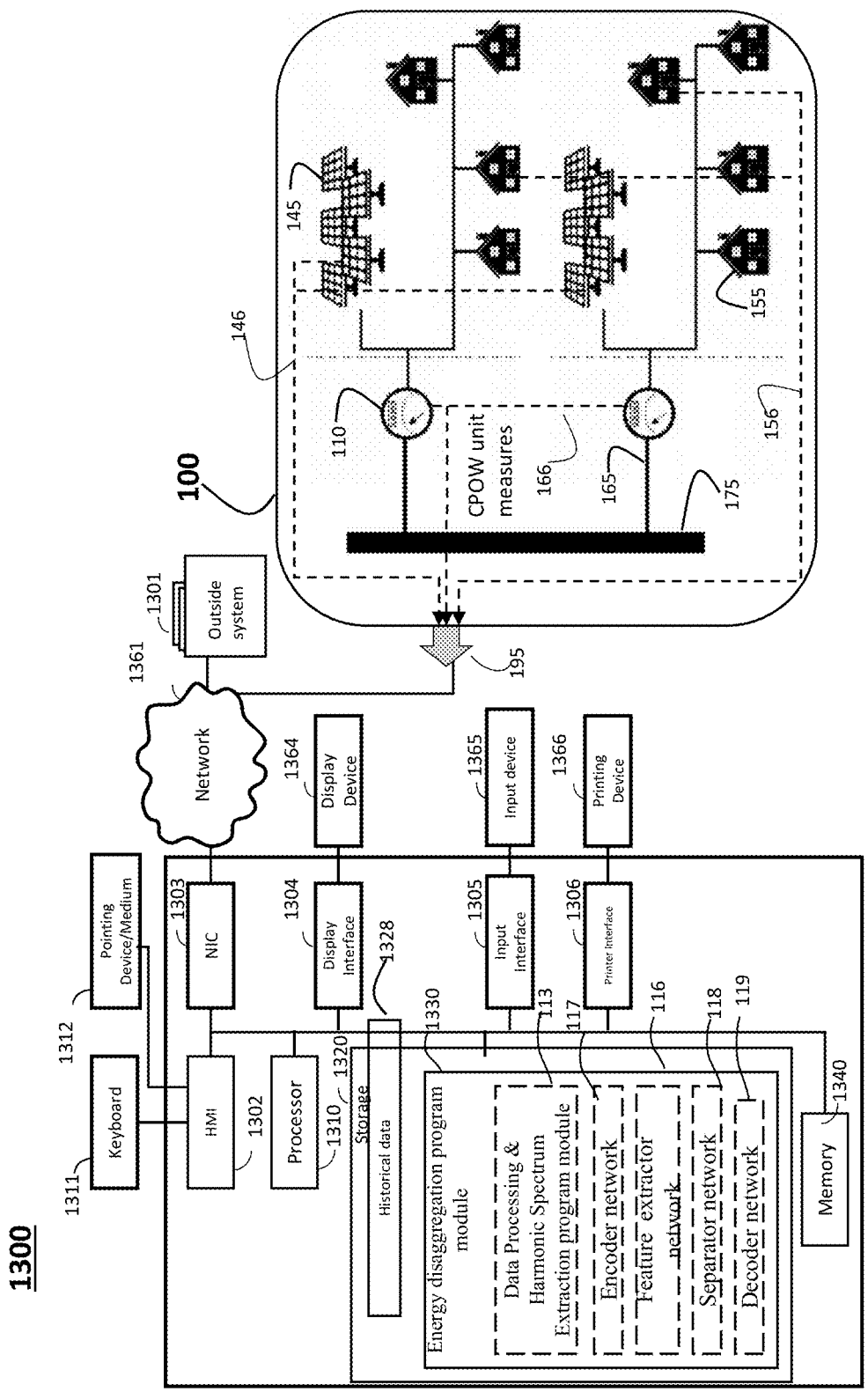
FIG. 13 is a block diagram illustrating an energy disaggregation system for a power distribution system, according to some embodiments of the invention.

FIG. 13 is a block diagram illustrating an energy disaggregation system for a power distribution system 100, according to some embodiments of the invention.

The energy disaggregation system 1300 includes a human machine interface (HMI) 1302 connectable with a keyboard 1311 and a pointing device/medium 1312, a processor 1310, a storage device 1320, a memory 1340, a network interface controller 1303 (NIC) connectable with a network 1361 including local area networks and internet network, a display interface 1304 connected to a display device 1364, an input interface 1305 connectable with an input device 1365, a printer interface 1306 connectable with a printing device 1366.

The energy disaggregation system 1300 can receive electric signals 195 indicating voltage and current measurements 166 of substations 175 or feeders 165 arranged in a distribution system 100, or regulation statuses, 146 and 156 of renewable generations 145 and customer loads 155 via the network 1361 connected to the NIC 1303. The network 1361 is connected to an outside system(s) 1301 that can provide control signals to the measurement devices 110 or the controllers of power generation 145 or load demands 155 of the distribution system 100 for performing remote control of the measurement devices, and the generation or load controllers. Further, the energy disaggregation system 1300 can provide the outside system 1301 controlling status data (signals) via the network 1361 so that the outside system 1301 can control measuring, generation or demand regulation actions arranged in the distribution system 100. Further, the energy disaggregation system 1300 can be controlled from the outside system 1301 by receiving control data (signals) of the energy disaggregation system 1300 via the network 1361.

The storage device 1320 includes historical load, generation and net-load data 1328 with respect to the distribution system 100 and an energy disaggregation system program module 1330. The input device/medium 1365 may include modules that read programs stored on a computer readable recording medium (not shown). For performing energy disaggregation for the distribution system 100, the energy disaggregation system 1300 may receive the status data 166 of the distribution system 100 from the measurement devices 110 included in the distribution system 100.

In accordance with some embodiments of the present invention, the distribution system 100 may include a substation (only secondary side bus of transformer shown in the FIG. 175, a set of feeders 165, a set of CPOW measuring devices 110, a set of renewable generators 145, and a set of customer loads 155. The energy disaggregation system 1300 uses the interface 1303 to receive measured voltage and current data via the network 1361 (communication network). The memory 1340 can load the computer-executable programs stored in the storage 1320, in which the computer-executable programs include a historical data 1328 and an energy disaggregation system program (module) 1330 configured to perform energy disaggregation for the distribution system 100.

The energy disaggregation system program (module) 1330 may include a data processing and harmonic spectrum extraction program module 113, an encoder network 117, a feature extractor network 116, a separator network 118, and a decoder network 119. At least one processor 1310 in connection with the memory 1340 and the interface 1303 are used to perform the energy disaggregation system program 1330 loaded from the storage 1320. For instance, when an abnormal frequency trajectory on the distribution system 100 is captured by outside system 1301, then an energy disaggregation task can be triggered by outside system 1301 through the processor 1310. The energy disaggregation module 1330 further causes the processor 1310 to receive voltage and current CPOW data from the measurements 195. Upon received these net-load CPOW measurements from measures 195, the energy disaggregation module 1330 first executes data processing and harmonic spectrum extraction module 113 to prepare time-frequency domain features for the disaggregation, then the energy disaggregation module 1330 implements the native loads and PV generations separation through its integrated sub-networks, decoder 119, separator network 118, feature extractor 116, and encoder 117 according to the time-frequency features generated by the data processing module 113. Then the processor 1310 outputs disaggregation results data with respect to the predicted renewable generations and native loads on the distribution system 100 through NIC 1303 back to outside system 1301, then based on the disaggregation results data, the outside system 1301 can determine either spilling the renewable energy if an abnormal higher frequency is detected, or cut the load demands if an abnormal lower frequency is identified. The outside system 1301 then sends corresponding regulation signals back to generators 145 and loads 155 in the distribution system 100. Further, the interface (NIC) 1303 can receive the update 195 of measured signals 166 and generation and load regulation status, 146 and 156 at every preset period of time via the network 1361 from the distribution system 100. In some cases, the instructions to start/perform predicting instantaneous renewable generation transmitted to the energy disaggregation system 1300 using the keyboard 1311 or from the outside system 1301 via the network 1361.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A computer-implemented method for performing energy disaggregation of a distribution system-level net-load measurements on a distribution system using continuous-point-on-wave (CPOW) measurement units, wherein the method uses a processor coupled with memory stored instructions implementing the method using neural networks including an encoder network, a feature extractor, a separator network, a decoder network stored in the memory, wherein the instructions, when executed by the processor carry out steps of the method, comprising:

generating net-load time-series data from voltage and current measurements via the CPOW measurement units;
generating, using the encoder network, a compressed latent space representation from the net-load time series;
converting the net-load time series into the time-frequency domain using a short-time Fourier transform (STFT) method;
passing time-domain cotextual information with the converted time-frequency domain representation of net-load time series to the feature extractor trained to accurately extract harmonic features;
estimating, using the separator network trained to assign weight to the compressed latent space representation, two weight matrices to be multiplied with an output from the encoder network and learning temporal features of a native load and a photovoltaic (PV) generation;
transforming, using the decoder network, the weighted compressed latent representation corresponding the native load and the PV generation into time-domain representations from outputs of the encoder network and the separator network; and
predicting, using a post-disaggregation adjustment method, the native load and the PV generation at distribution system-level from the transformed time-domain representations corresponding to the native load and the PV generation.

2. The method of claim 1, wherein the encoder network performs a one-dimensional (1D) convolution operation to transform the net-load time series into the compressed latent space representation of net-loads.

3. The method of claim 1, wherein the feature extractor network identifies, using the STFT method, the harmonic features introduced in the distribution system by inverter-based PV generation.

4. The method of claim 1, wherein the separator network uses a temporal convolutional network (TCN) to learn the temporal features, wherein the TCN includes sequential layers of stacked dilated 1D TCN blocks, wherein each of the stacked dilated 1D TCN blocks consists of a gated residual network.

5. The method of claim 4, wherein the stacked dilated 1D TCN blocks are stacked over each other such that a dilation factor goes on exponentially increasing as a function of the number of stacked layers.

6. The method of claim 5, wherein each 1D TCN block is a residual temporal gated linear unit (RT-GLU) incorporating TCN and residual learning into a new residual block.

7. The method of claim 1, wherein the decoder network transforms the weighted latent representation back into time-domain representations of the weighted latent representation using 1D transposed convolutions.

8. The method of claim 1, wherein the post-disaggregation adjustment method is used to refine the disaggregated native load and PV generation values around their predicted values by minimizing a total weighted squared error to ensure that a difference between the disaggregated native load and PV generation equals the net-load measurement.

9. The method of claim 1, wherein a discriminator is added to the neural networks regrouped as a generator to perform adversarial learning of energy disaggregation, wherein the input of the discriminator is shuffled between net-load measurements and net-loads determined based on an output of the generator, wherein the generator is composed by the encoder network, the feature extractor, the separator network, and the decoder network, wherein the input of the generator is the actual measurement data from CPOW units.

10. The method of claim 9, wherein the discriminator is a deeper network including convolutional layers for feature extraction, gated recurrent units (GRUs) for modeling temporal properties of net-loads, and sequentially stacked linear layers with decreasing dimensions for outputting a classification probability from the output of GRUs, wherein the probability indicates whether the input data is the actual measurement data from CPOW units or the generated data from the generator.

11. The method of claim 9, wherein the input of the discriminator is the feature space, and the discriminator is trained by two different sources of net-load data, one data source is a source domain with native load and PV generation labels, the other data source is a target domain without native load and PV generation labels, wherein the deviation between the source domain feature domain and the target domain feature space is minimized during the training.

12. The method of claim 11, wherein the discriminator consists of sequential fully connected layers with decreasing dimensions, wherein the final layer of the discriminator is a sigmoid activation function, wherein the output of the sigmoid function is a probability of the input data being from the source domain or target domain dataset.

13. A energy disaggregation system for performing energy disaggregation of a distribution system-level net-load measurements of a distribution system using continuous-point-on-wave (CPOW) measurement units, comprising:
a network interface controller configured to revieve measurement data of electric signals indicating voltage and current measurements of substations or feeders arranged in the distribution system;
a memory configured to store instructions implementing an energy disaggregation method using neural networks including an encoder network, a feature extractor, a separator network, and a decoder network; and
a processor coupled with the memory, wherein the processor is configured to execute the instructions that carry out steps of the energy disaggregation method, comprising:
generating, using the encoder network and the measurement data of the electric signals, a compressed latent space representation from the net-load time series;
converting the net-load time series into the time-frequency domain using a short-time Fourier transform (STFT) method;
passing time-domain cotextual information with the converted time-frequency domain representation of net-load time series to the feature extractor trained to accurately extract harmonic features;
estimating, using the separator network trained to assign weight to the compressed latent space representation, two weight matrices to be multiplied with an output from the encoder network and learning temporal features of a native load and a photovoltaic (PV) generation;
transforming, using the decoder network, the weighted compressed latent representation corresponding the native load and the PV generation into time-domain representations from outputs of the encoder network and the separator network; and
predicting, using a post-disaggregation adjustment method, the native load and the PV generation at distribution system-level from the transformed time-domain representations corresponding to the native load and PV generations.

14. The energy disaggregation system of claim 13, wherein the encoder network performs a one-dimensional (1D) convolution operation to transform the net-load time series into the compressed latent space representation of net-loads.

15. The energy disaggregation system of claim 13, wherein the feature extractor network identifies, using the STFT method, the harmonic features introduced in the distribution system by inverter-based PV generation.

16. The energy disaggregation system of claim 13, wherein the separator network uses a temporal convolutional network (TCN) to learn the learning, wherein the TCN includes sequential layers of stacked dilated 1D TCN blocks, wherein each of the stacked dilated 1D TCN blocks consists of a gated residual network.

17. The energy disaggregation system of claim 16, wherein the stacked dilated 1D TCN blocks are stacked over each other such that a dilation factor goes on exponentially increasing as a function of the number of stacked layers.

18. The energy disaggregation system of claim 17, wherein each 1D TCN block is a residual temporal gated linear unit (RT-GLU) incorporating TCN and residual learning into a new residual block.

19. The energy disaggregation system of claim 13, wherein the decoder network transforms the weighted latent representation back into time-domain representations of the weighted latent representation using 1D transposed convolutions.

20. The energy disaggregation system of claim 13, wherein the post-disaggregation adjustment method is used to refine the disaggregated native load and PV generation values around their predicted values by minimizing a total weighted squared error to ensure that the difference between the disaggregated native load and PV generation equals the net load measurement.

21. The energy disaggregation system of claim 13, wherein a discriminator is added to the neural network regrouped as a generator to perform adversarial learning of energy disaggregation, wherein the input of the discriminator is shuffled between net-load measurements and net-loads determined based on an output of the generator, wherein the generator is composed by the encoder network, the feature extractor, the separator network, and the decoder network, wherein the input of the generator is the actual measurement data from CPOW units.

22. The energy disaggregation system of claim 21, wherein the discriminator is a deeper network including convolutional layers for feature extraction, gated recurrent units (GRUs) for modeling temporal properties of net-loads, and sequentially stacked linear layers with decreasing dimensions for outputting a classification probability from the output of GRUs, wherein the probability indicates whether the input data is the actual measurement data from CPOW units or the generated data from the generator.

23. The energy disaggregation system of claim 21, wherein the input of the discriminator is the feature space, and the discriminator is trained by two different sources of net-load data, one data source is a source domain with native load and PV generation labels, the other data source is a target domain without native load and PV generation labels, wherein the deviation between the source domain feature domain and the target domain feature space is minimized during the training.

24. The energy disaggregation system of claim 23, wherein the discriminator consists of sequential fully connected layers with decreasing dimensions, wherein the final layer of the discriminator is a sigmoid activation function, wherein the output of the sigmoid function is a probability of the input data being from the source domain or target domain dataset.

* * * * *